INVENTOR.
JOHN ROY HUNT.
BY
ATTORNEYS

UNITED STATES PATENT OFFICE.

JOHN ROY HUNT, OF INDIANAPOLIS, INDIANA, ASSIGNOR TO INTERNATIONAL MOVING PICTURE & FILM COMPANY, OF NASHVILLE, TENNESSEE, A CORPORATION.

FILM-FEEDING MEANS FOR MOTION-PICTURE MACHINES.

1,427,597.   Specification of Letters Patent.   Patented Aug. 29, 1922.

Application filed June 16, 1919. Serial No. 304,686.

*To all whom it may concern:*

Be it known that I, JOHN ROY HUNT, a citizen of the United States, and a resident of Indianapolis, county of Marion, and State of Indiana, have invented a certain new and useful Film-Feeding Means for Motion-Picture Machines; and I do hereby declare that the following is a full, clear, and exact description thereof, reference being had to the accompanying drawings, in which like numerals refer to like parts.

This invention relates to new means for feeding a film in a moving picture projecting machine and particularly for giving the film a feeding movement alternately to two sucessive apertures. This last feature of the invention is particularly adapted for satisfactory projection of colored motion pictures.

The film feeding means is such that the pictures are projected through two apertures, one projecting the red rays and the other the green rays. During the dark period on the green lens, the film is moved so as to bring the red positive entirely across the aperture and stop the subsequent green picture just before the aperture. The same process of intermittent movement takes place alternately before the red aperture. During the time of exposure or projection of the green picture, the red picture remains stationary on the screen a sufficient length of time for the colors projected through both apertures to mingle and blend their relative values, for about two-thirds of the time. The arrangement is such that there is no absolutely dark period on the screen, but during the movement of the shutter closing out the red picture or green picture, as it may be, there are always sufficient colored light rays from both lenses reaching the screen to maintain a commingling of color, which gives the desired color effect during the period of transition of either the green or red picture. Since both the red and green pictures are being projected simultaneously for two-thirds of the time, and said transition is only for one-fourth of the revolution of the film-feeding cam, the observer is not dependent upon persistency of vision in order to obtain the true color value of the pictures. There is a momentary dissolving effect which causes the screen to reflect the full gamut of the spectrum. By this method and means is finally obtained all of the finer tones and graduations of color resulting in a perfect production of pictures photographed in natural colors.

The full nature of the invention will be understood from the accompanying drawings and the following description and claims.

Figure 1:
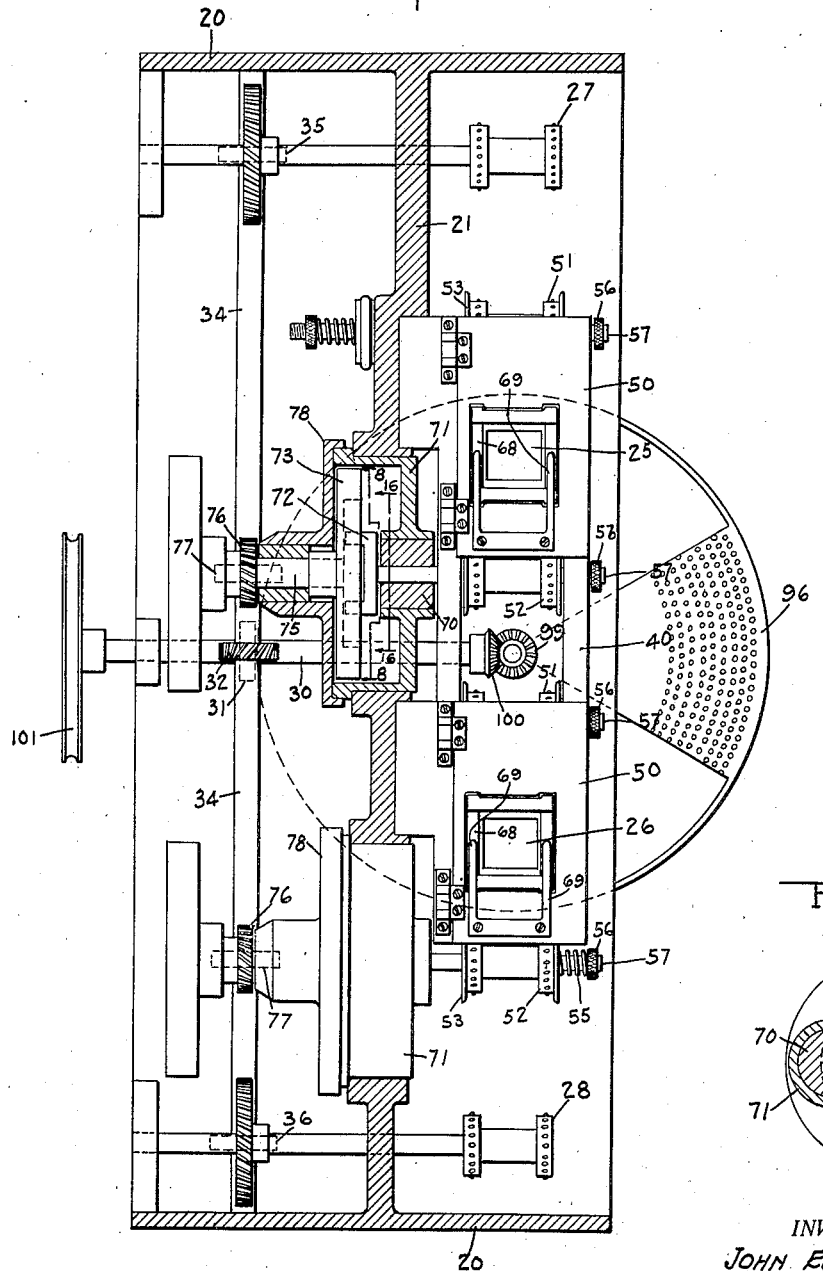
Figure 2:
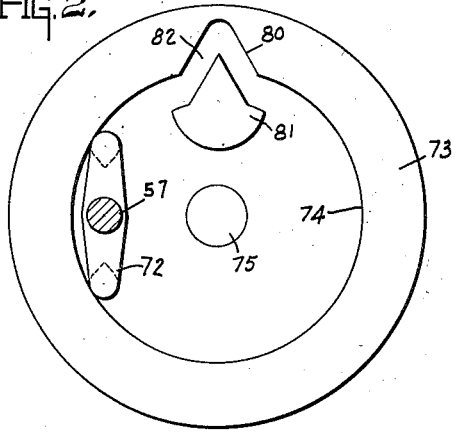
Figure 3:
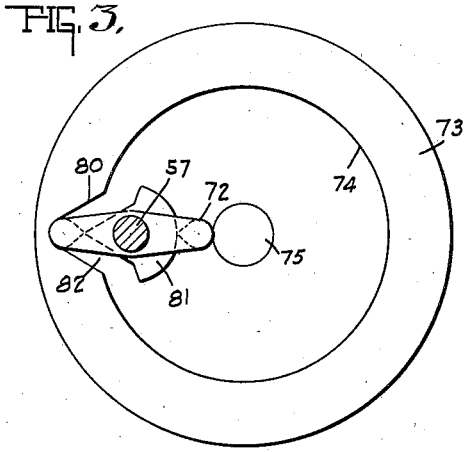
Figure 4:
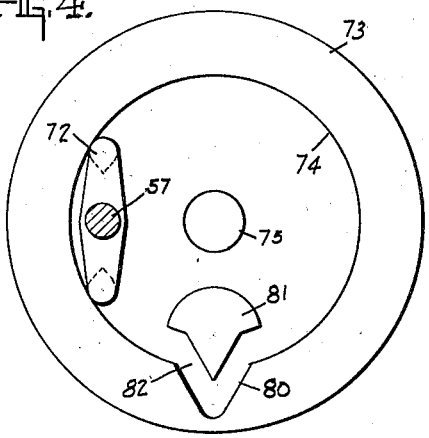

In the drawings, Figure 1 is a vertical transverse section of a moving picture projecting machine, parts, however, being shown in elevation. Fig. 2 is an elevation of the cam intermittent film feed mechanism shown on the line 2—2 of Fig. 1, the parts being in position just preceding the feeding movement. Fig. 3 is the same with the parts in their position at the middle of the feeding movement. Fig. 4 is the same showing the parts in their position at the close of the feeding movement. Fig. 5 is a section on the line 5—5 of Fig. 1, part being broken away to show an eccentric bearing for shaft 57.

There is shown herein a casing 20 preferably formed integral, as shown in Fig. 1, excepting doors are provided for closing the right-hand and left-hand sides of the casing, but said doors are omitted from the drawings. The mechanism is mounted in the casing 20, but not on the doors referred to.

For projecting pictures with their natural colors, the pictures on the film 23 have been formed so as to separate certain colors or shades. This is done in photographing the negative through the usual color filtration process. It is preferably made on panchromatic negative stock. In the practical adaptation of this invention the preferred color separations employed by me are orange-red and blue-green, which are referred to herein for brevity as "red" and "green," but the invention is not limited to the exact shades stated above as preferable. These two colors are, however, alternately employed in photographing the negative so that in one picture there will be color separation for red and in the next picture there will be color separation for green, or to express it more briefly, one picture on the negative is red and the next one green and those two colors alternate.

In this projecting machine there is an upper feed sprocket 27 and a lower take-up sprocket 28 and the means for driving the same, substantially as shown in my former Letters Patent.

30 is the driving shaft which carries a worm gear 31 shown by dotted lines in Fig. 1, which meshes with a worm gear 32 on a vertical shaft 34 which drives the upper feed sprocket 27 through a worm gear 35 and the take-up sprocket 28 through a worm gear 36.

As seen, there is a tracker plate 40 carrying aperture plates 41 and 42 for the upper and lower apertures 25 and 26.

The aperture plates 41 and 42 are spaced some distance apart so as to adapt the apertures for projecting the pictures of the different series in their natural sequence or order, as will hereafter be explained. There is the usual construction of film gates, one for each aperture and the film 23 passes down between the film gates and the aperture plates 41 and 42. Associated with the tracker plate there is a pilot tension sprocket 51 above each aperture and an intermittent feed sprocket 52 below each aperture.

The intermittent feed sprockets 52 are driven by the following means. On the end of the sprocket shaft 57 there is secured a pair of driving pins 72 which are driven and revolved by a cam 73 with which said pins engage in the manner shown in Figs. 1, 2, 3 and 4. The details of the driving pin construction consist of a horizontal plate centrally secured to the shaft 57, and on each end of said plate out of alignment with the shaft 57 and equidistant therefrom, a pair of oppositely located pins project into the recessed face of the cam so that the pin will engage the internal periphery 74 of the cam. The cam 73 is secured and meshes with a worm wheel 77 on the shaft 34, as seen in Fig. 3. 78 is a cover on the housing 71.

The internal periphery of the cam 73, as seen in Fig. 10, has at one point a V-shaped recess 80 and opposite said recess there is a V-shaped block 81 arranged so as to leave a V-shaped passageway 82 between said block and the V-shaped recess 80 of the cam wide enough for the pins 72 to pass. The width of the block 81 at its widest point is less than the distance between the two pins 72, so that the pin construction can pass over the block. Assuming the parts to be in the position shown in Fig. 2, and the cam rotating in the direction of the arrow, the upper pin 72 will enter the passageway 82 and go to the remote point thereof, as shown in Fig. 3, and as it does so the other pin will pass inside of the block 81 and as the pin which enters the passageway 82 emerges therefrom, the other pin will be revolved around against the inner periphery of the cam and thereby will rotate the shaft 57, 180 degrees, which constitutes one feeding movement of the film. This movement requires about 60 degrees of the rotation of the cam. During the remaining 300 degrees of rotation of the cam, the shaft 57 will not be actuated and the two pins 72 will bear against the inner periphery of the cam, as shown in Fig. 4, being held against such inner periphery by the eccentric bushing 70 which is so adjusted and set as to bring both pins against the inner periphery of the cam. While the cam drive herein gives the sprocket feed a half revolution during the 60 degrees revolution of the cam, the degree is not limited to the exact distance the cam rotates during this actuating movement of the sprocket shaft, but it is desirable that the sprocket shaft be given an actuating movement of 180 degrees each time that it is actuated. This enables a relatively small sprocket to be used, preferably a four picture sprocket instead of the usual 8 picture sprocket. The smaller the sprocket, the more accurately it feeds the film and in producing colored moving pictures by this machine, accuracy of guidance and feed are desirable.

The plate 86 is vertically adjusted by a screw 94 that screws through a post 95 on plate 89 that operates in a post 96 in the plate 86.

The shutter 96 is mounted on a shaft 97 in a bracket 98 and is driven by a beveled gear 99 thereon and beveled gear 100 on the driving shaft 30. The shaft 30 is driven by a pulley 101 or any other suitable means, and any suitable shutter may be employed.

At some point in the path of the light through each aperture and its corresponding lens, a colored slide must be placed, although the exact position is immaterial. In the machine herein shown for illustrating the general nature of this invention a colored slide 105 has been placed to the rear of the opening 106 in the casing opposite the upper aperture, said slide fitting in a holder 107. The same arrangement provides a slide for the lower aperture. One of these slides is red and the other green.

The movement of the film and operation of the machine, so far as the film is concerned, is as follows. The leader of the film is drawn through the machine until the first picture registers with the lower aperture 26 and then it shows and the film is fed down so as to move the No. 2 picture into position to register with the upper aperture 25 and then both films will be showing. At that time the V-shaped recess in the cam has passed the pins 72 90 degrees for the upper sprocket and the V-shaped recess of the lower sprocket lacks 90 degrees or reaching the pin 72 of the sprocket shaft. When the upper part of the film is fed down it makes a relatively large amount of slack. Since both the upper and lower cams move all of the time, 90 degrees further movement will bring the lower cam into position where it has given the lower sprocket feeding movement and has moved picture No. 1 away from the lower aperture and is moving picture No. 3 to the aperture, but is not yet showing. During this movement picture No. 2 is still showing through the upper aperture. Further rotation of the cams for 90 degrees brings them to the position where aperture No. 3 has been brought into projecting position through the lower aperture and picture No. 2 is still showing through the upper aperture. Another movement to 90 degrees of said cams will bring them into position where picture No. 3 is still showing through the lower aperture, but picture No. 2 has been moved away from the upper aperture. Although picture No. 4 is opposite the upper aperture, it is not shown because of the shutter. Another movement of the cams for 90 degrees will bring them to the position with No. 3 still showing through the lower aperture and No. 4 picture moved to position to show through the upper aperture. The next movement will move No. 3 picture away from the lower aperture and will be moving No. 5 picture towards the lower aperture.

Therefore, it is apparent that the film is alternately moved into position of the upper and lower apertures and during each of said movements, the cam which is rotating the particular feeding sprocket, whether upper or lower, passes through 60 degrees. This occurs once during each revolution of the upper cam and once during each revolution of the lower cam and said cams are so arranged with reference to each other as to give alternating movement. Consequently the lower part of the film will be given a feeding movement during 60 degrees rotation of the cam during which the shutter closes the lower aperture, but a picture is showing through the upper aperture. During the next 120 degrees of rotation of the cams, pictures are showing through both apertures. During the next 60 degrees rotation of the cams, the film is being moved across the upper aperture and no picture is showing because of the shutter, but there is a picture showing through the lower aperture. During the next 120 degrees rotation of the cams, pictures will be showing through both apertures. The foregoing explains a characteristic of the operation of this particular machine, but the invention is not limited to the exact arc through which the cams move for either the projecting or the non-projecting periods.

As stated herein the odd numbered pictures on the films and which are projected through the lower aperture, are the red pictures and the even numbered pictures which are projected through the upper apertures, are the green pictures. Therefore, the red and green colors would be projected on the screen for two-thirds of each revolution of the cams, that is, for two-thirds of the time, and that relatively long period of simultaneously producing both colors is desirable, for during said period the color values of the pictures on the screen are not dependent upon the persistency of vision. Heretofore where colored pictures have been alternately projected, the color values were dependent wholly upon the persistency of vision and, therefore, the final shades and tones were lost and there was a relatively great amount of flicker. Therefore, in the operation of this machine, the colored films are dependent upon persistency of vision for only one-sixth of a revolution of the cams, which is so very brief as to be practically nill so that in the actual operation of the machine, and its practical effect, the simultaneous projection of both pictures extends through such a relatively large period of time that the color values are substantially the same during the entire operation of the machine as during the 120 degrees of simultaneous projection of both pictures. An important result is that the pictures are presented on the screen in their natural colors and the values of their shades and tones are obtained without depending upon persistency of vision.

The invention claimed is:

1. Film feeding means for a motion picture machine, including a film feeding sprocket, a constantly rotating cam having an internal periphery with an outwardly projecting V-shaped portion, a block within the internal periphery with an outwardly projecting V-shaped portion opposite the internal periphery at its V-shaped portion so as to leave a V-shaped passageway between them, and a bar for driving the feeding sprocket which has a pair of pins projecting from it engaging the internal periphery of said cam and adapted to pass through said V-shaped passageway as the cam is rotated and give the feeding sprocket a continuous half revolution.

2. Film feeding means for a motion picture machine, including a film feeding sprocket, a constantly rotating cam having an internal periphery with an outwardly projecting V-shaped portion, a block within the internal periphery with an outwardly projecting V-shaped portion opposite the internal periphery at its V-shaped portion so as to leave a V-shaped passageway between them, and a bar for driving the feeding sprocket which has a pair of pins projecting from it engaging the internal periphery of said cam and adapted to pass through said V-shaped passageway as the cam is rotated and give the feeding sprocket a continuous half revolution during the rotary movement of the cam of substantially 60 degrees.

3. A film feeding means for a machine for projecting colored motion pictures, including a film feeding sprocket, a constantly rotating cam having an internal periphery with an outwardly projecting V-shaped portion, a block within the internal periphery with an outward V-shaped projection opposite the internal periphery at its V-shaped portion so as to leave a V-shaped passageway, a shaft on which the sprocket wheel is secured, a cross bar secured on said shaft with a pin at each end thereof, the two pins adapted to engage the internal periphery of the cam, so that when they pass through the V-shaped passageway during the rotary movement of the cam the feeding sprocket shaft will be given a continuous half revolution.

In witness whereof, I have hereunto affixed my signature.

JOHN ROY HUNT.